UNITED STATES PATENT OFFICE.

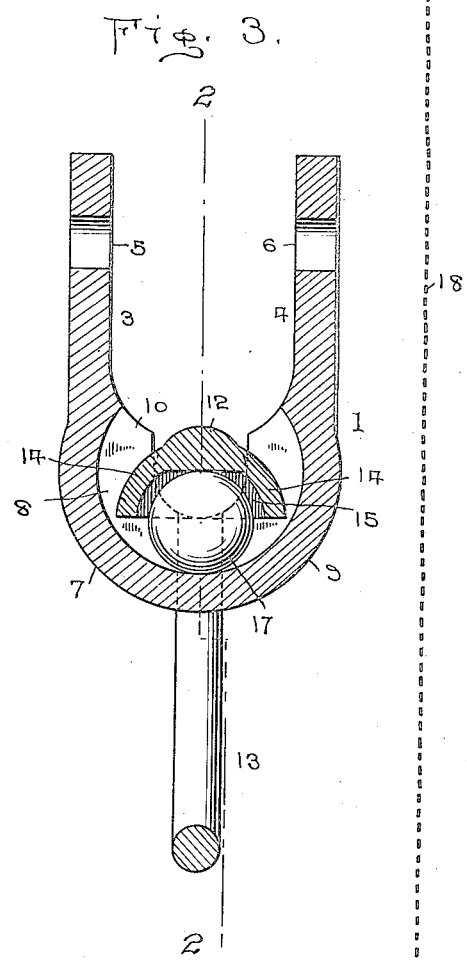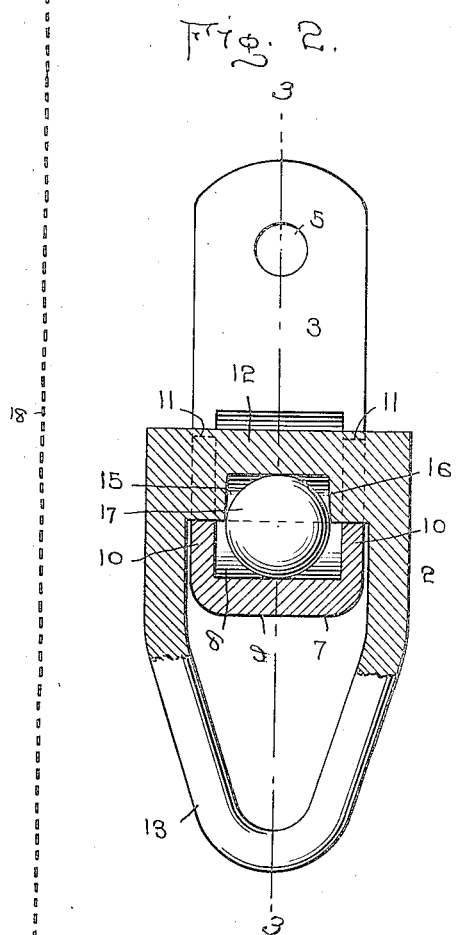

ELIAS J. DAKIN, OF WASHINGTON, DISTRICT OF COLUMBIA.

HANGER.

1,139,464.   Specification of Letters Patent.   Patented May 11, 1915.

Application filed August 5, 1913. Serial No. 783,058.

*To all whom it may concern:*

Be it known that I, ELIAS J. DAKIN, a citizen of the United States, residing at Washington, District of Columbia, have invented certain new and useful Improvements in Hangers, of which the following is a specification.

This invention relates to a new and useful improvement in hangers more particularly to those used for supporting swings.

The object of the invention is to insure evenness of movement; to reduce friction; to avoid wear at particular points and to distribute the pressure over a greater surface.

The invention consists primarily in a hanger composed of two portions and an intervening single sphere.

In the annexed drawings: Figure 1 represents the device in use attaching a swing in place. Fig. 2 is an enlarged section of the device on line 2—2, Fig. 3. Fig. 3 is an enlarged section of the device on the line 3—3, Fig. 2.

In these drawings: The numerals 1 and 2 represent the complementary portions of the hanger. The portion 1 has the two ears 3 and 4 with holes 5 and 6 for securing the device in place for use. This portion 1 has the body 7, provided with the curved recess 8. This curved recess 8 is formed by the curved wall 9 of the body 7 and the flat ends 10. In these flat ends 10 are made grooves 11. This curved recess 8 forms a chamber in the portion 1. The portion 2 is link-shaped, having a cross-bar 12 and the looped part 13 attached to or formed with the cross-bar 12. Extending from each side of the cross-bar 12 is a wing 14. These wings are curved downwardly. On the underside these wings 14 and the cross-bar 12 are reduced so as to form an underneath curved recess 15. The portion 16 of the recess in the cross-bar 12 is less in length than the distance between the ends 10 of the portion 2. Between the two portions 1 and 2 is a sphere 17, preferably solid and of steel and having a diameter less than the width of the curved recess 8 of the body 7 of the portion 1 of the hanger.

The portion two is caught over the portion 1 with the sphere 17 between them. The ends of the cross-bar 12 come into the grooves 11 and the wings 14 between the ends 10. The sphere 17 rests in the recess 8, the curved recess 15 being above the sphere. The sphere 17 is of such diameter that the cross-bar 12 does not bear on the ends 10, in the grooves 11. As shown in Fig. 2, the hanger is secured in place with the portion 2 below. The chains 18 of the swing are caught by hooks 19 into the link ends 13 of the portion 2 of the hanger.

As the swing is used, the weight comes upon the sphere 17 which moves back and forth in the recess 8, the recess forming a run-way for the sphere. With such construction, the bearing in the hanger is taken upon the two parts diametrically opposite through the sphere. On account of the shape of the latter these points of bearing vary indefinitely in use. And as the portion 16 of the recess 15, in the cross-bar 12 is of a length less than the distance between the ends 10 of the portion 2 of the hanger, and the diameter of the sphere 17 is less than the width of the curved recess 8 of the body 7 of the portion 1 of the hanger, the position of the sphere 17 will vary in the recess 8. Hence travel of the sphere will not be always in the same traverse but will have an indefinite variable movement. This will minimize wear on the parts and obviate strain and wear on any particular direction and location.

The wings insure the traverse of the sphere, forcing it backward and forward and the shape of the recess in the wings and cross-bar cause the sphere to have a varied and not a regular movement.

Having described my invention, what I claim is:

1. A hanger comprised of two portions, each having a recess and an intervening sphere, the diameter of which is less than the width of the recess in one portion.

2. A hanger comprised of two portions, each having a recess, the recess in one portion being greater in width than that in the other portion and an intervening sphere having a diameter less than the width of the greater recess.

3. A hanger comprised of two portions, one having a circular recess, the other having a cross-bar having a recess in the underside with a width less than that of the circular recess and a sphere in the two recesses having a diameter less than the width of the circular recess.

4. A hanger composed of two portions, one having a curved recess, the other having a cross-bar, and two wings extending from the cross-bar, the cross-bar and the two wings having a recess in the underside and a sphere in the two recesses.

5. A hanger composed of two portions, one having a curved recess and ends, the other having a cross-bar and two wings, extending from the cross-bar, the two wings and the cross-bar having a recess in the underside, that portion of the recess in the cross-bar being less than the distance between the ends of that portion of the hanger having the curved recess, and a sphere in the recesses in the two portions of the hanger.

In testimony whereof I affix my signature in presence of two witnesses.

ELIAS J. DAKIN.

Witnesses:
  C. E. FETZER,
  W. H. SINGLETON.